United States Patent [19]

Barringer et al.

[11] Patent Number: 4,543,341

[45] Date of Patent: Sep. 24, 1985

[54] SYNTHESIS AND PROCESSING OF MONOSIZED OXIDE POWDERS

[75] Inventors: Eric A. Barringer, Waltham; M. Bruce Fegley, Jr., Waban; H. Kent Bowen, Belmont, all of Mass.

[73] Assignee: Massachusetts Institute of Technology, Cambridge, Mass.

[21] Appl. No.: 565,000

[22] Filed: Dec. 23, 1983

[51] Int. Cl.$^4$ .................... C04B 35/00; C04B 35/46
[52] U.S. Cl. ........................................ 501/1; 264/56; 423/593; 423/608; 423/622; 501/94; 501/103; 501/105; 501/152; 501/134; 501/135
[58] Field of Search ............. 423/608, 622, 593, 338; 501/1, 94, 103, 105, 152, 134, 135; 264/56, 65, 0.5

[56] References Cited

U.S. PATENT DOCUMENTS

| | | | |
|---|---|---|---|
| 4,010,242 | 3/1977 | Iler et al. | 423/608 |
| 4,301,034 | 11/1981 | McDaniel | 423/338 |
| 4,365,011 | 12/1982 | Bernard et al. | 423/608 |
| 4,372,865 | 2/1983 | Yu et al. | 264/65 |
| 4,459,245 | 7/1984 | Ryon et al. | 264/0.5 |

OTHER PUBLICATIONS

Mazdiyasni, K. S. et al.—Preparation of Ultra-High--Purity Submicron Refractory Oxides—J. of Am. Cer. Soc. (1965), pp. 372–375.

Sakka, S.–"Gel Method for Making Glass", Treatise on Materials Science and Technology, vol. 22, Jul. 8, 1982, pub. by Academic Press Inc., N.Y.C., pp. 129–136, 159–160, 164–167.

Barringer, E. A. et al., "Formation, Packing and Sintering of Monodisperse TiO$_2$ Powders"—J. Am. Ceram. Soc., 65 (12), Dec. 1982, C199–C201.

*Primary Examiner*—Helen M. McCarthy
*Attorney, Agent, or Firm*—Arthur A. Smith, Jr.; Thomas J. Engellenner

[57] ABSTRACT

Uniform-size, high-purity, spherical oxide powders are formed by hydrolysis of alkoxide precursors in dilute alcoholic solutions. Under controlled conditions (concentrations of 0.03 to 0.2 M alkoxide and 0.2 to 1.5 M water, for example) oxide particles on the order of about 0.05 to 0.7 micron can be produced. Methods of doping such powders and forming sinterable compacts are also disclosed.

9 Claims, 6 Drawing Figures

SYNTHESIS AND PROCESSING OF MONOSIZED OXIDE POWDERS

The U.S. Government has certain rights in this invention pursuant to a contract with the Department of Energy No. DE-AC02-80ER10588. A002.

TECHNICAL FIELD

This invention relates to chemical synthesis and, in particular, to the production of fine powders of metallic oxides, such as titania, zirconia, zinc oxides and the like.

BACKGROUND OF THE INVENTION

Advances in ceramic processing have permitted the replacement of various components of electrical and mechanical equipment with sintered ceramic parts. For example, ceramics have found widespread use in electronic components, cutting tools and, to a lesser degree, as structural substitutes for metal parts in engines and other machinery. Lightweight ceramic parts are, in fact, preferable in many applications because of their refractory properties and chemical inertness. However, the properties exhibited by ceramic materials are determined by the sintered microstructure and under present processing techniques the properties can be highly variable depending, in large part, upon the quality of the starting powder. In some industries the cost of rejection of ceramic parts at various processing stages (i.e., raw material inspection, part shaping, firing and finishing) can approach a cumulative 50 percent of the total manufacturing cost.

Typically, the process of manufacturing ceramic parts begins with the packing of a metallic oxide powder into a mold (or otherwise shaping and compressing) to form a so-called "green body" that is subsequently sintered at high temperature to yield the ceramic material.

In some applications, a porous ceramic body is desired, for example, chemically inert porous structures can serve as filter membranes, chromatography substrates, catalytic substrates and gas sensors (when appropriately doped). For such porous applications, the green bodies are typically formed at about 40 to 50 percent of their maximum density. In other applications, where structural strength is most important, the preferred density of the green body ranges from about 60 to about 70 percent so that the final ceramic part can approach its theoretical maxiumum density upon sintering.

A wide variety of prior art techniques for producing sinterable powders are known. Most conventional techniques begin with the heating (calcining) of metallic nitrates or hydroxides followed by pulverizing and further grinding to yield metallic oxide powders. Two basic problems with these techniques have been the large size distributions (i.e., from about 0.5 micron to about 10 micron) and the irregular shape of the particles. Because of these factors, orderly packing of powders into green bodies has been difficult and sintering at high temperatures (i.e., 1700° C.) has been necessary. Accordingly, sintered microstructures (and properties) have not been readily controlled.

It has also been suggested that metallic oxides can be precipitated by hydrolysis of metal alkoxides from liquid solutions. See generally, Mazdiyasni et al., "Preparation of Ultra-High-Purity Submicron Refractory Oxides", Vol. 48, *J. of Am. Ceramic Society*, pp. 372-375 (1965). However, the particles formed by this method are extremely small (average size: 100 to 200 angstroms) and tend to agglomerate, which makes effective sintering difficult unless sintering additives are utilized.

There exists a need for better methods for making fine metallic oxide powders and the like. Preferably, the powders should be monosized (or have a very small size distribution), spherical, non-agglomerated and have an optimal size of about 0.05 to about 0.7 microns (depending upon the material and specific processing plans). Such powders would find widespread use and satisfy a variety of long-felt needs in forming ceramic parts for advanced electrical, structural, and energy conversion applications.

SUMMARY OF THE INVENTION

We have discovered that uniform-size, high-purity, spherical oxide powders can be formed by hydrolysis of alkoxide precursors in dilute alcoholic solutions. Under controlled conditions (concentrations of 0.03 to 0.2M alkoxide and 0.2 to 1.5M water, for example) oxide particles on the order of about 0.05 to about 0.7 microns can be produced.

Our invention can be used to manufacture monosized, dispersed particles of a wide variety of ceramic materials, such as titania, zirconia, or zinc oxide. These materials may be doped during the production process or subsequently to yield powders suitable for electrical ceramic parts (ZnO, TiO$_2$). Moreover, because of the ideal size of our particles, sintering without additives to near their theoretical densities at lower temperatures (e.g., less than 1100° C. for TiO$_2$) is possible.

In general, the formulae for carrying out our syntheses can be described as follows: first, the metallic alkoxides react with water in the dilute alcoholic solutions according to the following reaction:

$$M(OR)_x + H_2O \xrightarrow{HOR} M(OH)_x + ROH \qquad (I)$$

where M is the metallic ion and x is determined by valence balancing constraints. The resulting hydroxide then condenses to form the oxides according to the formula:

$$M(OH)_x \rightarrow MO_y \cdot nH_2O + H_2O \qquad (II)$$

Again where x and y are determined by valence considerations; the oxides then are collected as precipitates.

The invention will next be described in connection with certain preferred emodiments; however, it should be clear that various changes and modifications can be made by those skilled in the art without departing from the spirit and scope of the invention.

DESCRIPTION OF THE PREFERRED EMBODIMENTS

The invention will next be described in connection with the follwing non-limiting examples:

EXAMPLE I $TiO_2$ powders were prepared by the controlled hydrolysis of a dilute alcoholic solution of titanium tetraethoxide, $(Ti(OC_2H_5)_4)$. Since homogeneous nucleation of particulates was desired, all liquids were ultrafiltered through 0.22 micrometer pore-size filters to minimize the level of insoluble impurities (200 proof ethanol, alkoxides, and deionized water). The alkoxide was dissolved in ethanol; water was dissolved in a separated portion of the alcohol. All work was conducted under nitrogen atmosphere. The two solutions were mixed using a magnetic stirrer giving a solution with concentrations of 0.1 to 0.2M alkoxide and 0.3 to 1.0M water. The molar ratio of water to alkoxide was 3 or greater. Subsequent precipitation of amorphous, hydrated $TiO_2$ occurred in 2 to 90 seconds (at room temperature); the time decreased as the concentration of either reagent was increased. (The powder was repeatedly washed with deionized water and ultrasonically dispersed in slightly basic aqueous solutions (pH=9 to 10). Alternatively, powders can be washed in other solutions depending upon the desired media for later processing. Powder compacts, prepared by gravitational or centrigugal settling of the dispersions, were vacuum dried at 160° C. and sintered in air at 1050° C.).

Figure 1:
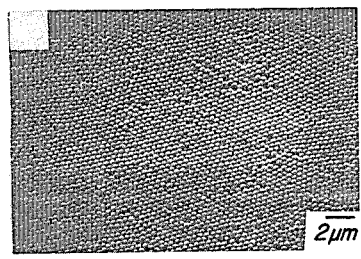
FIG. 1 is a photomicrograph of titania particles formed according to our invention.

FIG. 1 shows a dense, uniform compact formed by sedimentation of the $TiO_2$ powder. The successful synthesis of the uniform-size $TiO_2$ powder was promoted by the simultaneous satisfaction of several conditions. First, proper reagent concentrations are necessary to promote a single-nucleation regime of homogeneous nucleation. Second, insoluble impurities should be removed from reagents to prevent heterogeneous nucleation. Third, reagents should be completely mixed prior to particle nucleation, so that nucleation occurs uniformly throughout the solution. Fourth, small particles (diameter below 0.1 micrometers) are susceptible to flocculation upon collision, especially $TiO_2$ under neutral dispersion conditions; thus, fast growth rates of particles from the nucleus size to about 0.1 micrometer diameter are recommended to minimize the residence time of small particles. In addition, slow stirring speeds are recommended during the growth stage; high particle collision energies from more rapid stirring results in considerable flocculation.

The $TiO_2$ powders produced by our process were amorphous in electron and X-ray diffraction. The particles were spherical in shape and average particle size (ranging from 0.3 to 0.7 microns) decreased for increased water concentrations and fixed alkoxide concentration, but remained essentially constant for increased alkoxide concentrations and fixed water concentration. The size distribution was very narrow for these powders (sigma about 0.09). As a rule, the size ratio of the largest particles to the smallest particles was less than 3, and the ratio of the largest particles to the mean size was less than 2.

The state of aggregation of the dispersed powder and subequent packing into green bodies, both of which significantly affect the sinterability of the compact, depend on the stability of the powder dispersion. Stability against coagulation for aqueous dispersions of oxide powders requires a low electrolyte concentration (generally less than 0.01M) and a solution pH several pH units above or below the isoelectric point (IEP) of the oxide. The IEP, the pH at which no net charge exists in the particle/liquid interface region, is between 4.5 and 6.0 for crystalline $TiO_2$ and was assumed to have a similar value for the amorphous powders. Hence, dispersing the $TiO_2$ powders in distilled water at a pH above 9 or below 4 always resulted in stable dispersion—the particles remained non-agglomerated.

Figure 1A:
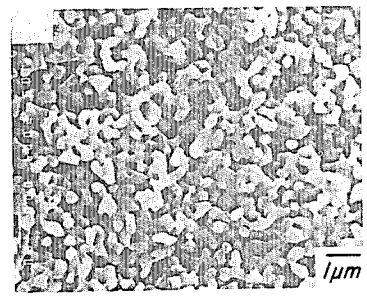
FIG. 1a is a photomicrograph of a porous titania ceramic part formed by sintering a low density compact of our particles.
Figure 1B:
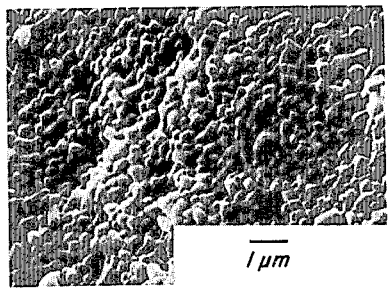
FIG. 1b is a photomicrograph of a non-porous titania ceramic part formed by sintering a higher density compact of our particles.

Sintered microstructures clearly demonstrated the effects of powder packing uniformity on the final microstructure. Sintering a porous compact consisting of agglomerated $TiO_2$ powder resulted in the low density structure. Conversely, dense, uniform compacts of $TiO_2$ powders sintered to greater than 99% of theoretical density at 1050° C., a temperature much lower than the 1300°-1400° C. reported to sinter conventional $TiO_2$ powders to 97% of theoretical density. The average particle size in the green compact was 0.35 microns and the average sintered grain size was approximately 0.5 microns. FIG. 1a shows a porous titania structure and FIG. 1b shows a dense titania structure formed according to our methods and then sintered.

EXAMPLE II

Doped $TiO_2$ powders for varistor, grain-boundary capacitor and oxygen sensor applications were formed from dilute ethanolic solutions of titanium tetraethoxide and water. The basic procedure was identical to that described above and consisted of adding a solution of water in ethanol to one of the titanium and dopant ethoxides in ethanol and mixing; precipitation was rapid (occurring in 5 to 60 seconds at 25° C.). The donor dopant ($Nb^{5+}$ or $Ta^{5+}$) was incorporated uniformly in the particle through cohydrolysis of the dopant ethoxide, which had been added to the initial titanium ethoxide/ethanol solution. The overall reaction is described by:

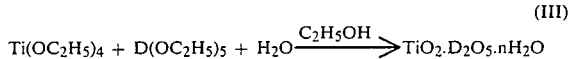

$$Ti(OC_2H_5)_4 + D(OC_2H_5)_5 + H_2O \xrightarrow{C_2H_5OH} TiO_2 \cdot D_2O_5 \cdot nH_2O \quad \text{(III)}$$

where D=Ta or Nb and n is about 0.5. Reagent concentrations used in the experiments were 0.1M alkoxide and about 0.3-1.5M water; all precipitation reactions were conducted under dry $N_2$ using 200 proof anhydrous ethanol.

The counter dopant (e.g., $Ba^{2+}$, $Sr^{2+}$, or $Cu^+$) was placed onto the powder surface by two methods: inorganic salt precipitation, performed after the powder had been washed and redispersed in water; or by metal alkoxide hydrolysis, performed immediately after the powder precipitation reaction (before washing). The first method is schematically represented by the general reaction:

$$D'Cl_2(aq) + (NH_4)_2CO_3(aq) \rightarrow D'CO_3 \text{ (on particles)} \quad \text{(IV)}$$

where D'=Ba, Sr, Cu. Carbonic acid ($H_2CO_3$) may also be used as the carbonate source. In addition to chlorides, other halides, nitrates and sulfates may be used as the soluble inorganic salts. The metal carbonate, which is deposited on the particle surface, decomposes during sintering (prior to densification) to yield the appropriate metal oxide.

The second method, the metal alkoxide hydrolysis, is schematically represented by the general reaction $$D'(OR)_2 + H_2O \rightarrow D'(OH)_2 \text{ (on particle)} \tag{V}$$

where $D' = Ba$ or $Sr$. The metal hydroxide also decomposes on heating to yield either BaO or SrO.

A wide variety of doped titania powders have been prepared using the methods outlined above. Table I summarizes the dopant combination and chemical composition (dopant level desired) of powders produced. Chemical analyses by plasma emission spectroscopy and instrumental neutron activation analysis indicated that the powders were doped to the desired levels and that dopants were not lost nor were contaminants added during handling. Moreover, the spherical shape and the narrow particle size distribution observed for pure $TiO_2$ were maintained.

TABLE I

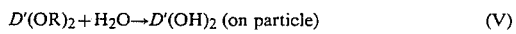

| Sample | Ba | Nb | Sr | Ta | Cu |
|---|---|---|---|---|---|
| 1 | 0.2 | 0.2 | | | |
| 2 | 0.2 | 0.5 | | | |
| 3 | 0.2 | 0.7 | | | |
| 4 | 0.2 | | | 0.5 | |
| 5 | | 0.5 | 0.2 | | |
| 6 | | | 0.8 | 1.0 | |
| 7 | | 1.0 | 0.8 | | |
| 8 | | | | 0.5 | 0.2 |
| 9 | | 0.5 | | | 0.2 |
| 10 | | | | | |
| 11 | 1.0 | | | 1.0 | |
| 12 | 1.0 | 1.0 | | | |
| 13 | | 1.0 | 1.0 | | |
| 14 | | | 1.0 | 1.0 | |
| 15 | | 0.1 | | | |
| 16 | | 0.5 | | | |
| 17 | | 1.0 | | | |
| 18 | | | | 0.1 | |

EXAMPLE III

Zirconia ($ZrO_2$) powders were formed with analogous reactants by the controlled hydrolysis of dilute alcoholic solutions of zirconium tetra n-propoxide or zirconium tetra isopropoxide, $Zr(OC_3H_7)_4$ according to the general reaction:

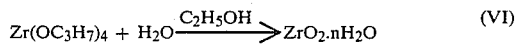

$$Zr(OC_3H_7)_4 + H_2O \xrightarrow{C_2H_5OH} ZrO_2 \cdot nH_2O \tag{VI}$$

where n is about 2.0. The alkoxide was dissolved in ethanol. Water was dissolved in a separate portion of the alcohol. The two solutions were mixed in a glove box under nitrogen using a magnetic stirrer giving precipitation of amorphorous, hydrated $ZrO_2$ in 3 to 40 seconds. Reagent concentrations used in the experiments were typically about 0.03M alkoxide and about 0.21-0.48M water. The time required for precipitation decreased as the reagent concentrations were increased or as the temperature was increased. The powder was repeatedly washed with deionized water and ultrasonically dispersed in slightly basic aqueous solutions (pH=9 to 11). Powder compacts, prepared by gravitational sedimentation of the dispersions were sintered in air to >98% theoretical density at 1200° C. for the n-propoxide derived $ZrO_2$ powder.

Figure 2:
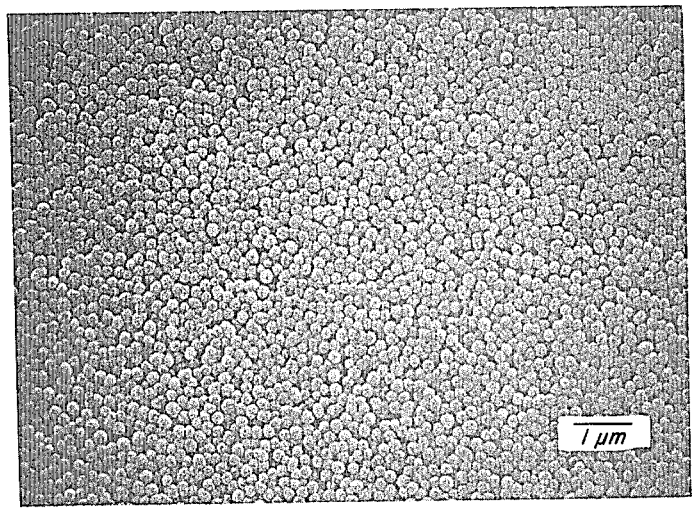
FIG. 2 is a photomicrograph of zirconia particles formed according to our invention.

FIG. 2 shows a dense, uniform compact formed by sedimentation of the spheroidal $ZrO_2$ powder. The $ZrO_2$ powders produced by our process were amorphous in X-ray diffraction. The particles were spherical in shape with a very narrow size distribution. The average particle size for the n-propoxide derived zirconia was about 0.4 microns.

Chemical analyses of the as-prepared $ZrO_2$ powder by plasma emission spectroscopy demonstrated the high purity of the powder with very low levels of cation impurities. Electron probe microanalysis (EPMA) and proton induced X-ray emission (PIXE) analysis of sintered $ZrO_2$ ceramics derived from the alkoxide produced powder showed that very low hafnia ($HfO_2$) contents (<500 ppm) are present in the isopropoxide derived powder. Furthermore, the EPMA results show that the $ZrO_2$ powder is not contaminated during processing to a ceramic piece.

Figure 2A:
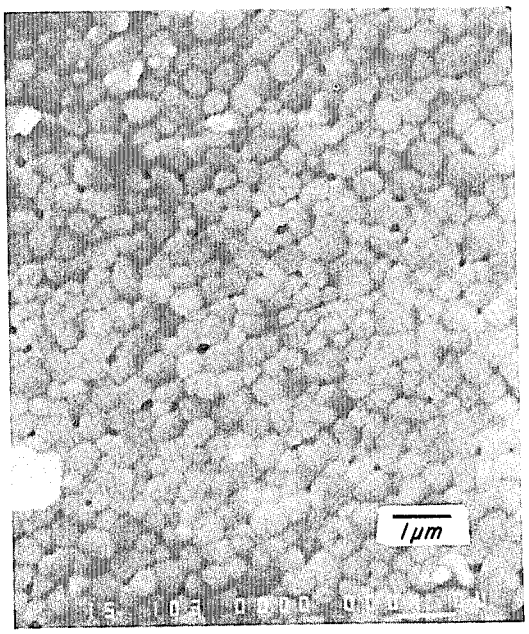
FIG. 2a is a photomicrograph of a non-porous zirconia ceramic part formed by sintering a higher density compact of our particles.
Figure 3:
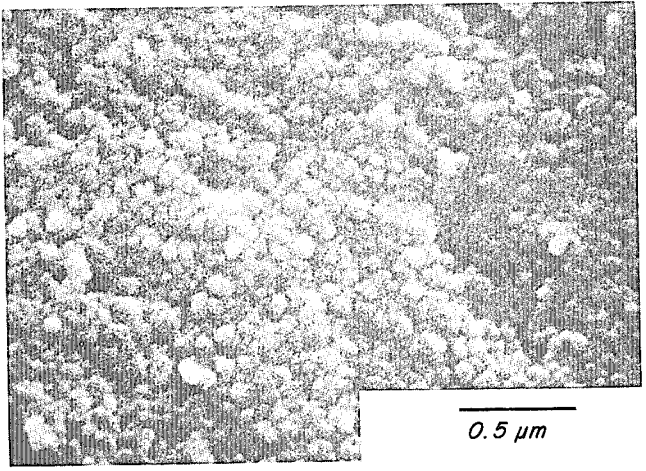
FIG. 3 is a photomicrograph of zinc oxide particles formed according to our invention.

Fig. 2a shows a zirconia structure formed according to our methods and then sintered.

EXAMPLE IV

Yttria-doped zirconia was prepared by a method analogous to that of the doped titania powders described in Example II above. The general formula for the cohydrolysis reaction was as follows:

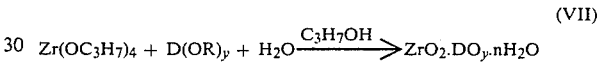

$$Zr(OC_3H_7)_4 + D(OR)_y + H_2O \xrightarrow{C_3H_7OH} ZrO_2 \cdot DO_y \cdot nH_2O \tag{VII}$$

where R is an alkyl group such as $-C_3H_7$, y is determined by valence balancing considerations, n is about $1 \propto 2$, and D is yttrium or a similar dopant. Reagent concentrations are typically about 0.1M alkoxide and about 1.0M alkoxide and about 1.0M water. A reaction procedure analogous to that described in Example II, gives yttria-doped zirconia powders with an average size of approximately 0.2 microns. EPMA results on sintered yttria-doped zirconia ceramics demonstrate that the chemical doping is homogeneous and that very little contamination is introduced during the processing operations.

Additionally, zirconia/alumina, zirconia/spinel, and zirconia/mullite two phase materials were prepared by the controlled precipitation of zirconia onto the respective oxide powders or by the mixing of alkoxide derived zirconia with size-sorted alumina powder. EPMA results on sintered $ZrO_2$/alumina, $ZrO_2$/spinel, and $ZrO_2$/mullite ceramics demonstrate that the desired zirconia concentrations are obtained.

EXAMPLE V

Zinc oxide powders were also prepared by the controlled hydrolysis of zinc doubles alkoxides, such as Na—Zn and Li—Zn alkoxides. Typically, the double alkoxide was dissolved in 200 proof absolute ethanol (about 0.03M solution) in a nitrogen atmosphere glove box. The solution was heated at approximately 45° C. After the zinc alkoxide was dissolved, water (about 0.56M) and ammonium hydroxide ($5 \times 10^{-3}$M) were added to the solution with stirring. Precipitation of hydrated zinc oxide starts about 2 minutes later. Stirring is continued for 10 additional minutes to insure a reasonably complete reaction.

The precipitation reaction may be represented by the general formula:

 (VIII)

where M may be Li or a similar metal and n is approximately 0.2 to 0.3. The ZnO particles produced by the hydrolysis reaction are spheroidal, have an average particle size of approximately 400 angstroms and are of high purity as indicated by plasma emission spectroscopic analyses. The Li (or similar metal) remained in solution and was not incorporated in the ZnO powder.

EXAMPLE VI

Doped zinc oxide powders were prepared by methods analogous to those discussed in Example II above. Bismuth dopant was added by the hydrolysis of bismuth isopropoxide $Bi(OC_3H_7)_3$ (reaction V) or of bismuth trichloride $BiCl_3$ (reaction IV). When the isopropoxide was used, it was dissolved in hot 200 proof absolute alcohol and was added to the dispersed zinc oxide powder. The excess water left in the dispersion was sufficient to hydrolyze the isopropoxide. After washing this powder, it was either processed into ceramic pieces or was further doped with manganese. The manganese dopant was added by the precipitation of manganese carbonate (reaction IV). The powder was dispersed in an aqueous solution of manganese (II) chloride and a solution containing ammonium carbonate was poured into the first solution while stirring. The manganese dopant was precipitated as manganese carbonate on the powder surface. Chemical analyses of the doubly doped powder by plasma emission spectroscopy showed that the desired bismuth and manganese dopant levels were obtained by these methods. EPMA and PIXE analyses of sintered zinc oxide ceramics also showed that the desired dopant levels could be obtained in the ceramic piece with very low levels of impurities.

We claim:

1. A method of forming generally spherical, sinterable metallic oxide metallic oxide powders with a narrow size distribution comprising:
    (a) under inert atmosphere hydrolyzing a dilute alcoholic solution of a metallic alkoxide wherein the solution ranges from about 0.2 to about 1.5 molar water and the concentration of the alkoxide ranges from about 0.03 to 0.2 molar alkoxide; and
    (b) collecting the precipitate.

2. The method of claim 1 wherein the alkoxide is chosen from the group of titanium alkoxides, zirconium alkoxides, zinc double alkoxide and mixtues thereof.

3. The method of claim 1 wherein the alkoxide is a titanium alkoxide and the resulting oxide is titania.

4. The method of claim 1 wherein the alkoxide is a zirconium alkoxide and the resulting oxide is zirconia.

5. The method of claim 1 wherein the alkoxide is a zinc alkoxide and the resulting oxide is zinc oxide.

6. The method of claim 1 wherein the hydrolyzing step further comprises cohydrolyzing an alkoxide of a suitable dopant to yield a doped powder.

7. The method of claim 1 wherein the hydrolyzing step further comprises co-precipitating a dopant from a soluble inorganic salt to yield a doped powder.

8. A method of forming sinterable compacts which yield uniformly dense ceramic structures upon sintering, the method comprising:
    (a) dispersing particles of at least one metallic oxide in a solution having a low electrolyte concentration, the particles having generally spherical shapes, a narrow size distribution and a mean diameter ranging from about 0.05 microns to about 0.7 microns;
    (b) maintaining the pH of the solution sufficiently above or below the isoelectric point to avoid agglomeration of the particles in solution; and
    (c) forming the particles by sedimentation into an orderly packing arrangement in a desired shape.

9. A method of forming sinterable compacts which yield porous ceramic structures upon sintering, the method comprising:
    (a) dispersing particles of at least one metallic oxide in a solution, the particles having a spherical shape, a narrow size distribution, and a mean diameter ranging from about 0.05 microns to about 0.7 micron;
    (b) manipulating at least one parameter chosen from the group of electrolyte concentration and pH to permit controlled agglomeration; and
    (c) forming the particles by sedimentation into a desired shape.

* * * * *